(12) United States Patent
Tagliaferri

(10) Patent No.: US 7,882,587 B2
(45) Date of Patent: Feb. 8, 2011

(54) SELF-PROPELLED VEHICLE FOR CLEANING ROADS AND THE LIKE

(75) Inventor: Fabrizio Tagliaferri, Trecasali (IT)

(73) Assignee: Dulevo International, S.p.A., Sanguinaro di Fontanellato (Parma) (IT)

( * ) Notice: Subject to any disclaimer, the term of this patent is extended or adjusted under 35 U.S.C. 154(b) by 709 days.

(21) Appl. No.: 11/977,638

(22) Filed: Oct. 25, 2007

(65) Prior Publication Data

US 2008/0098562 A1 May 1, 2008

(30) Foreign Application Priority Data

Oct. 31, 2006 (IT) .......................... MI2006A2094

(51) Int. Cl.
*E01H 1/04* (2006.01)

(52) U.S. Cl. .................. 15/84; 15/78; 15/83; 15/340.1; 15/340.3; 15/340.4; 180/69.5; 280/834

(58) Field of Classification Search ................ 15/340.1, 15/340.3, 340.4, 78, 82–87; 180/69.4, 69.5; 280/830, 831, 834

See application file for complete search history.

(56) References Cited

U.S. PATENT DOCUMENTS

| 3,902,219 | A | * | 9/1975 | Jones ........................... 15/314 |
| 4,779,303 | A | * | 10/1988 | Duthie et al. ................. 15/326 |
| 6,023,813 | A | * | 2/2000 | Thatcher et al. .............. 15/320 |
| 2004/0128788 | A1 | * | 7/2004 | Goff .......................... 15/340.4 |

* cited by examiner

*Primary Examiner*—Mark Spisich
(74) *Attorney, Agent, or Firm*—R. Ruschena Patent Agent, LLC

(57) ABSTRACT

There is disclosed a vehicle comprising: a chassis (1*a*) extending in a longitudinal direction (1*b*) and with lateral sides (1*c*) parallel to the longitudinal direction (1*b*); a storage apparatus (5) for a fuel gas; an engine (2) utilizing fuel gas; wheels (2*a*) at least partly driven by the engine (2); driving means (14); a container (3) for refuse and pollutants; and conveying members (4) suitable to convey refuse and pollutants towards the container (3); the container (3) having side panels (3*a*) provided with recesses (15) expanding inward and extending above the lateral sides (1*c*); and the storage apparatus (5) comprising a plurality of tanks disposed in the recesses (15) and supported by the chassis (1*a*). The recesses (15) are also provided with connecting walls suitable to facilitate the flow of refuse inside said container (3).

15 Claims, 3 Drawing Sheets

SELF-PROPELLED VEHICLE FOR CLEANING ROADS AND THE LIKE

FIELD OF THE INVENTION

The present invention relates to a self-propelled vehicle for cleaning roads and the like, suitable to operate over vast areas and with extended work cycles, and comprising: a chassis extending in a longitudinal direction; a storage apparatus for a fuel gas, an engine suitable to utilize fuel gas, wheels, driving means, a container for refuse and pollutants, and conveying members suitable to convey refuse and pollutants from the roads to the container.

DESCRIPTION OF THE PRIOR ART

There are known self-propelled vehicles called road sweepers and provided for cleaning roads, urban areas, vast spaces and the like. These vehicles have large dimensions and prevalently utilize internal combustion engines fuelled by petrol or diesel for propulsion.

These engines have the advantage of even being very powerful and relatively light, but the drawbacks related thereto are well known: the pollution caused by exhaust gases and the high cost of petrol and diesel.

These are particularly relevant drawbacks for said cleaning vehicles.

In fact, road cleaning vehicles and the like are utilized to remove refuse and pollutants from the environment. It is therefore desirable that they do not in turn release pollutants into the environment.

Moreover, as these vehicles are utilized for many hours each day, it is necessary to reduce to a minimum fuel costs, which have a high incidence on the economy of running these vehicles.

These drawbacks can be solved, at least partially, utilizing a gas fuelled engine, in particular natural gas or LPG.

In fact, it is known that internal combustion engines using a gas as fuel, in particular natural gas, produce less pollution than petrol or diesel engines. Moreover, the energy obtained from fuel gases has a lower unit cost than energy obtained from petrol or diesel.

However, in turn this propulsion with natural gas or LPG has some important drawbacks.

In particular, given the same weight, the fuel range is considerable penalized.

This drawback is important for road cleaning vehicles, as they must perform cleaning operations that last for several hours, if possible without stops or detours to refuel.

Moreover, there are often very few natural gas or LPG filling stations in the territory and in fact it is often necessary for cleaning vehicles to fill up with fuel at a station located at the headquarters or at the depot or garage area managed by the operator of these vehicles.

Therefore, it is advisable for the vehicles to complete their entire cleaning operation utilizing a single refill of fuel, before returning to said depot.

It has been calculated that these vehicles must have a fuel range of approximately 8 hours in order to be utilized according to the criteria indicated.

To obtain a fuel range of this dimension a large volume of fuel gas, and therefore one or more very large tanks, must be provided.

Large tanks, sufficient for a work cycle of over 6 hours, are difficult to position on the vehicles in question, as they already have several bulky members: for example, various brushes and rollers, tanks for reducing dust, various refuse conveying members, and above all a refuse container as large as possible.

This container must be very large to allow extended work cycles and so that the refuse collected does not require to be transported to a dump or the like several times a day. The container must also have a tipping mechanism, to allow fast emptying operations.

However, to install large tanks it is not advisable to increase the dimensions of these sweeping vehicles, which are already large and which must be able to circulate easily on urban roads, even those that are relatively narrow or partially obstructed by parked vehicles. They must also be able to perform noteworthy deviations in trajectory and various maneuvers between cars or at narrow intersections.

Not only do said tanks to be installed have the drawback of being of large dimensions, but also of being of considerable weight, which is added to the weight of the fuel gas.

In fact, they must be able to withstand high internal pressure stresses, to avoid the risk of explosions. Therefore, they are made of metal material of considerable thicknesses, of around one centimeter, which makes their weight considerable.

Installation of fuel gas tanks therefore causes problems of weight and balancing the masses of road sweeping vehicles.

In particular, the considerable added weights must not produce excessive local stresses on the road sweeping vehicles or compromise the stability thereof, or limit the driving or maneuvering speed along roads and work areas.

SUMMARY OF THE INVENTION

In this situation the technical aim of the present invention is to devise a self-propelled vehicle for cleaning roads and the like capable of substantially overcoming the aforesaid drawbacks.

Within said technical aim, an important object of the invention is to realize a vehicle with low pollution, reduced operating costs and a high fuel range.

Another important object of the invention is to realize an internal combustion self-propelled vehicle for cleaning roads and the like having correct balancing of masses.

The technical aim and the objects specified are achieved by a self-propelled vehicle for cleaning roads and the like, comprising a container with side panels provided with recesses expanding toward the inside of the container and extending above the lateral sides and in continuity therewith, a storage apparatus comprising a plurality of tanks suitable to contain fuel gas disposed at least prevalently in said recesses and supported by said the chassis of the same vehicle.

The vehicle according to the invention, propelled by fuel gas, generates much lower pollution and is cheaper with respect to cleaning vehicles utilizing petrol or diesel.

BRIEF DESCRIPTION OF THE DRAWINGS

The attached drawings show, by way of example, preferred embodiments of the invention. In particular.

DESCRIPTION OF THE PREFERRED EMBODIMENTS

Figure 1:
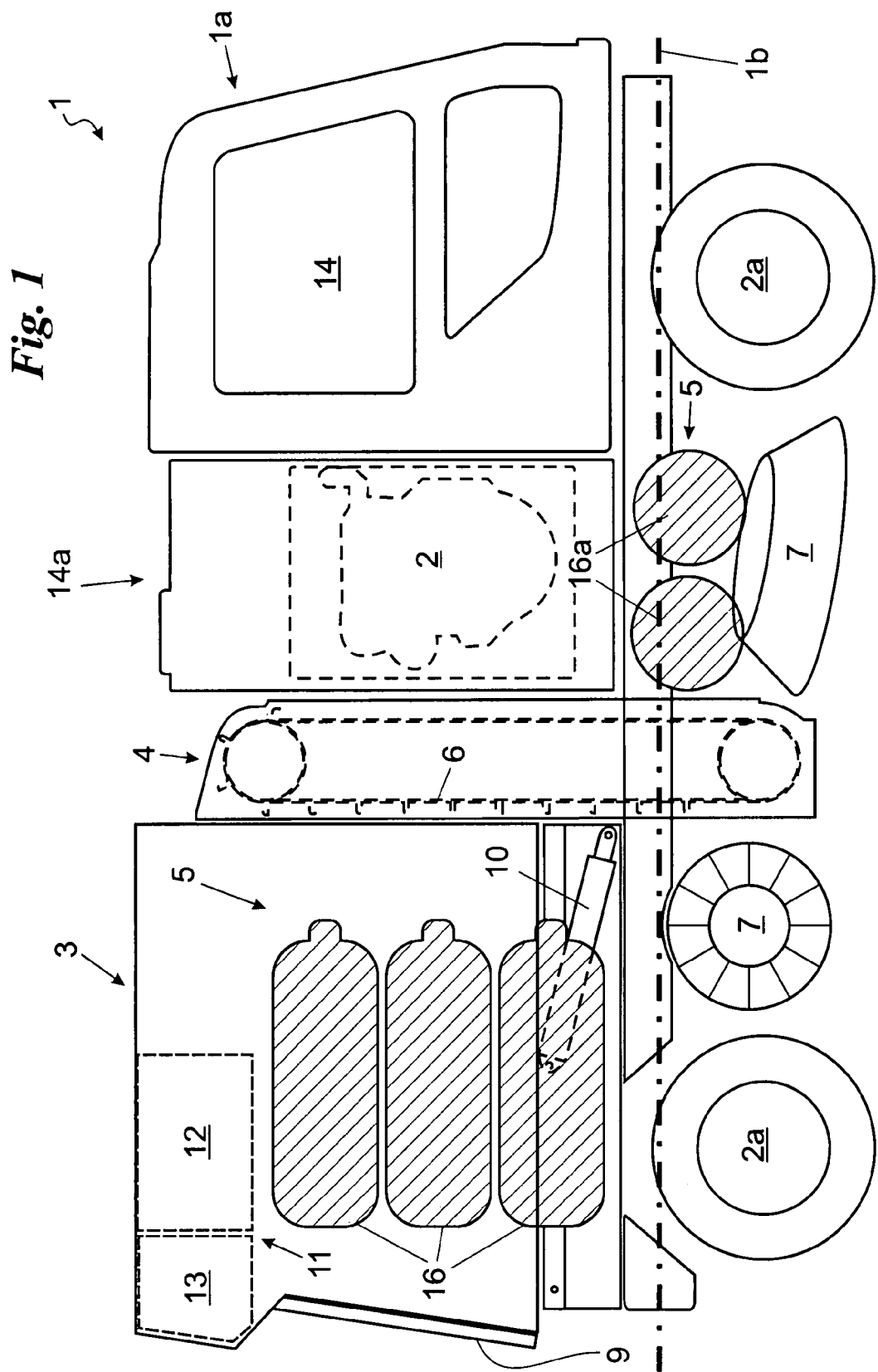
FIG. 1 shows a side view of the vehicle according to the invention.

With reference to the Figures, the vehicle according to the invention is indicated as a whole with the number 1.

In short, it comprises a chassis 1a extending prevalently in a longitudinal direction 1b and lateral sides 1c substantially parallel to said longitudinal direction 1b.

Associated with the chassis 1a is storage apparatus 5 for a fuel gas such as LPG and preferably natural gas, an engine 2 suitable to utilize the fuel gas, and wheels 2a driven at least in part by the engine 2.

Also provided are driving means 14 and above all a large container 3 for refuse and pollutants, functionally associated with conveying members 4 suitable to convey refuse and pollutants from roads and various surfaces or areas towards the container 3. According to the invention, the container 3 has side panels 3a provided with recesses 15 expanding toward the inside of the container 3 and extending substantially above the lateral sides 1c of the chassis 1a, and in continuity therewith. Moreover, the storage apparatus 5 is realized by a plurality of tanks suitable to contain the fuel gas and disposed at least prevalently in the recesses 15. The tanks 5 are supported by the chassis 1a, by means of an adequate rigid lattice.

Advantageously, the recesses 15 are connected to the side panels 3a of the container 3 by means of connecting walls tilted in a manner suitable to facilitate the flow of refuse inside this container 3.

When the container 3 is of the tipping type, as in the preferred embodiment thereof, the recesses 15 are also dimensioned and shaped in a manner suitable to allow the container 3 to be raised without interfering with the tanks 5, integral with the chassis 1a.

In greater detail and by way of a non-limiting example, the internal combustion engine 2—utilizing LPG or preferably natural gas—can be similar to the natural gas engine produced by "Iveco Motors" and denominated "NEF CNG engine". This engine has a displacement of 5.88 dm$^3$, a rating of 147 kW and a maximum torque of 650 N/m. It also has an average consumption of 245 g/kWh, dimensions of 891 mm by 831 mm by 1041 mm and a weight of almost 0.5 tons.

Also present on the market are different types of engines 2, at least partly gas fuelled, and having sufficient ratings to move a vehicle 1 for cleaning roads and the like.

The engine 2 can also be operated—in addition—with different fuels, such as petrol or diesel. In this case, the vehicle 1 comprises members to contain both fuels: gas and petrol or diesel, and utilizes one or the other according to the conditions.

Moreover, the engine 2 can be flanked by a secondary engine, such as an electric engine.

At the front the vehicle 1 has driving means 14 associated with a cab and at the rear of the cab and substantially contiguous therewith is an area 14a to house the engine 2.

The refuse conveying members 4 and the container 3 are then provided in sequence, substantially contiguous with the area 14a.

In particular, the conveying members 4 can be of different types. For example the conveying members 4 can comprise a vertical transport mechanism 6 with a conveyor belt or chain fed by at least one brush 7 provided on the bottom of the vehicle 1 and in contact with the road or the like.

Alternatively, the vertical transport mechanism 6 can operate by means of pneumatic suction of the refuse, or in yet another manner.

The container 3 is instead realized by a closed container, the outer walls of which approximately define a parallelepiped.

Figure 2:
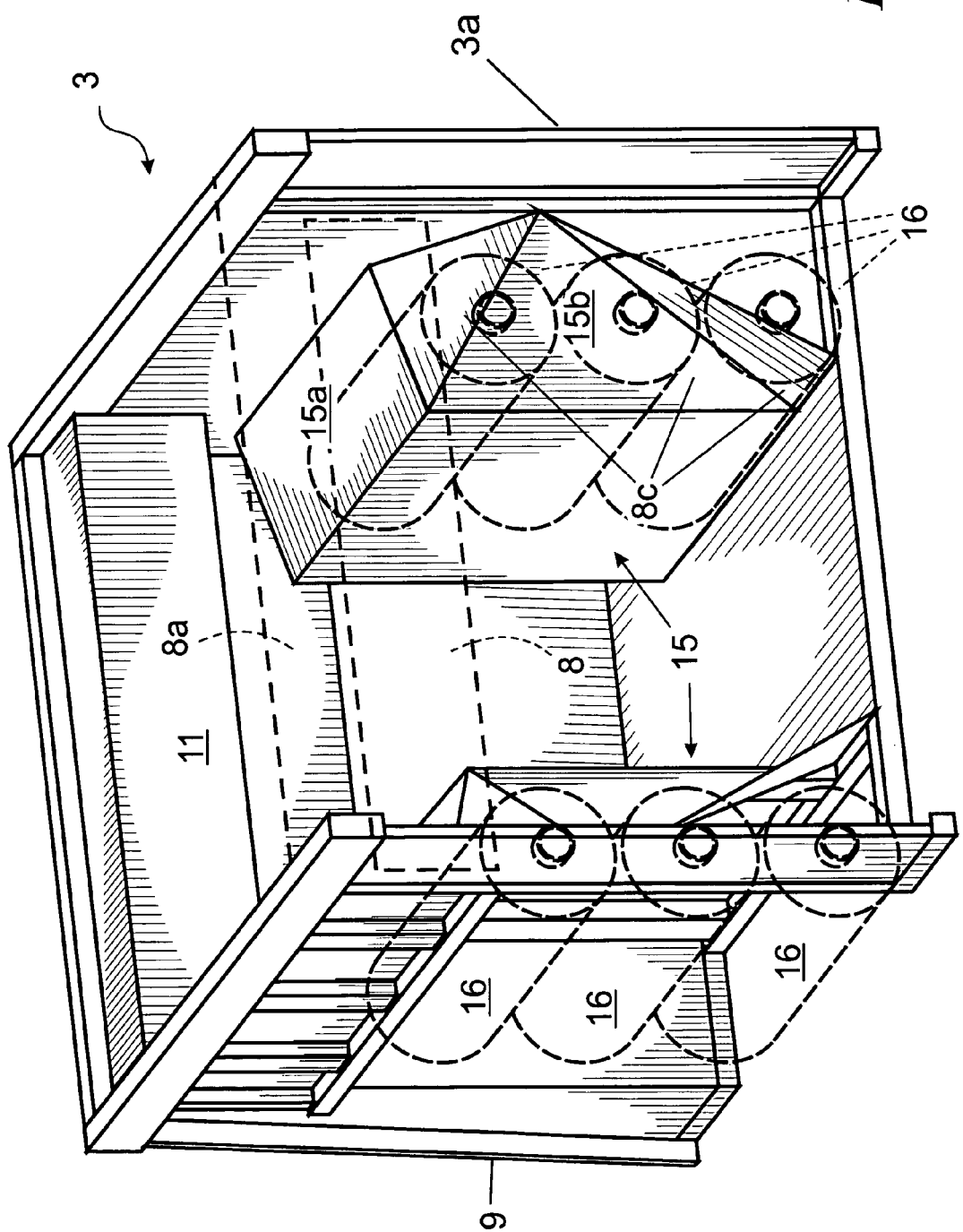
FIG. 2 shows an axonometric view of a part of the vehicle according to the invention.
Figure 3:
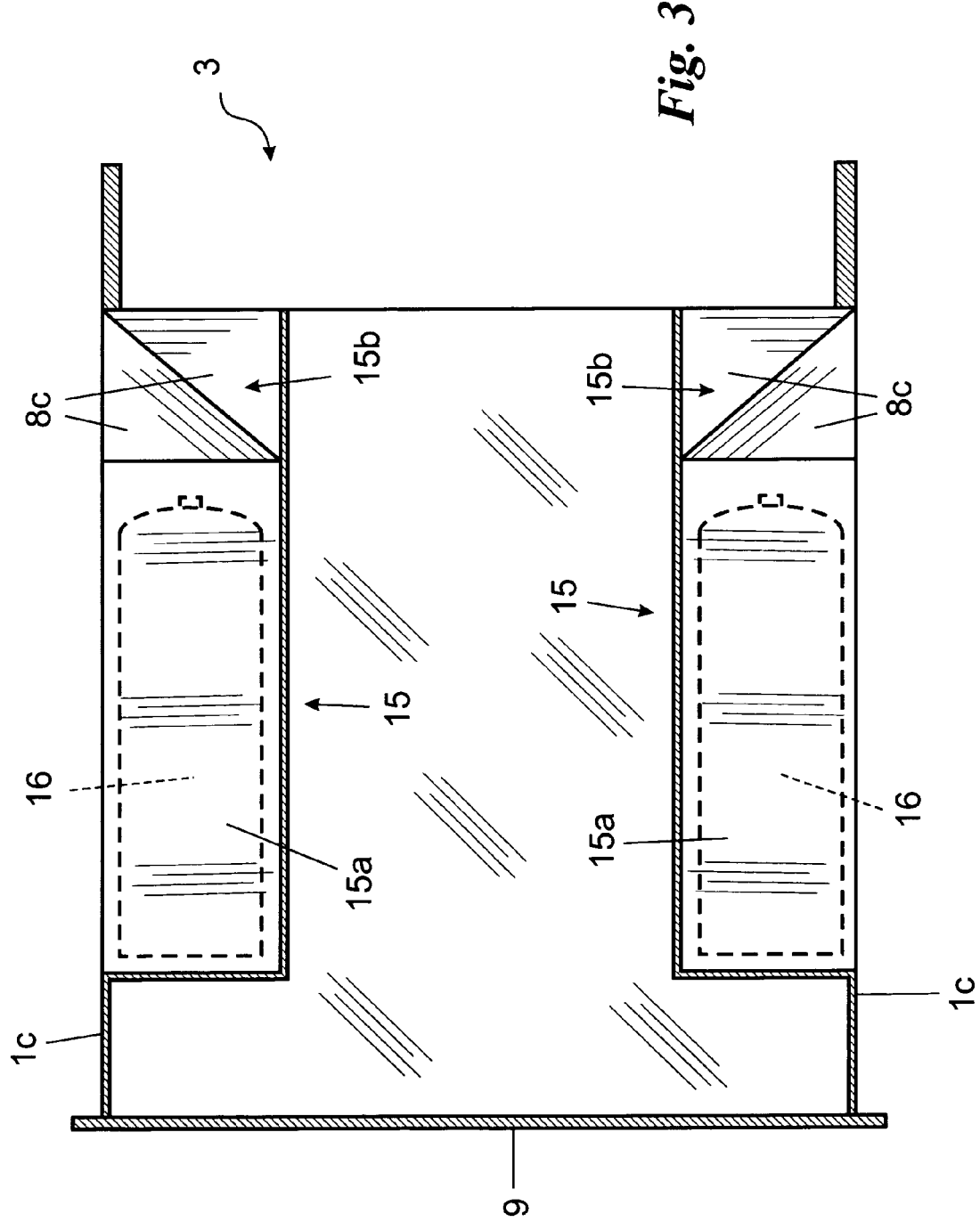
FIG. 3 shows the part in FIG. 2 in a top sectional view.

The container 3 comprises a wide front inlet 8 for the refuse and pollutants (broken line in FIG. 2), preferably realized by a rectangular opening positioned on the front face 8a of the container 3.

The front inlet 8 has a width close to the width of the container 3, between the side panels 3a, and is positioned in the upper portion thereof.

On the opposite side, on the rear side of the container 3, which coincides with the rear side of the vehicle 1, a rear discharge door 9 for the refuse is also provided.

The container can be tipped by means of a specific tipping mechanism 10, realized by fluid dynamic cylinders or the like. Tipping of the container 3 allows fast discharge of the refuse through the discharge door 9.

The container 3 also preferably comprises a wide filter system 11 for the particles of pollutant, appropriately positioned in the upper portion of this container 3 and coinciding with the door 9.

The filter system 11 preferably comprises a filter 12, suitable to retain the particles of pollutant and realized, for example, by a bag filter or by an electromagnetic filter or yet again by an absolute filter, and an air suction fan 13, suitable to convey the air containing particles of pollutant and present in the container 3 through the filter 12 and subsequently into the outside environment.

The container 3 defines lateral housings for the tanks 5.

These lateral housings are realized by said recesses 15 of the side panels 3a and of the base of the container 3. They suitably have a length, in the longitudinal direction of the vehicle 1, ranging from 1.5 m to 2 m, a height ranging from 1.5 m to 2 m and finally a width ranging from 0.3 m to 0.7 m.

The recesses 15 have a rear wall, in the vicinity of the door 9, and a preferably flat and vertical lateral wall.

Differently, an upper connecting wall 15a is provided, realized by a surface—preferably flat—tilted with respect to a horizontal plane so as not to provide a surface to retain refuse and so as to facilitate a flow of refuse fed from above.

Moreover, a front connecting wall 15b is provided, suitably realized so as not to have areas in which refuse accumulates and not to create corners that are difficult to access on the base of the container 3 in a position opposite the door 9.

Therefore, these walls preferably define a plan section of the container 3 which, from the front side to the rear side has no lateral segments perpendicular to the longitudinal direction of the container 3, or more preferably has no reductions in width.

In fact, also in this case areas in which refuse accumulates could be created far from the door 9 and located in proximity to the inlet 8.

In particular, in the vicinity of the front inlet 8, secondary connecting walls 8c are provided, positioned between the front face 8a and the recesses 15 and suitable to define surfaces tilted toward the bottom of the container 3, to eliminate areas in which refuse accumulates between the front face 8a and the recesses 15.

The tanks 5 are at least partly located in the housings or recesses.

In particular, tanks 5 are provided, realized by three cylindrical bottles 16 superposed and disposed in horizontal position, i.e. with the axis thereof extending prevalently horizontally parallel to the longitudinal direction 1b.

These bottles 16 preferably have a capacity ranging from 65 dm³ to 110 dm³, and more preferably ranging from 73 dm³ to 100 dm³.

These cylindrical bottles 16 preferably have a length below the length of the recesses, to allow tipping of the container 3 without creating points of interference. However, the lowest bottle of the three cylindrical bottles 16 can be of a lesser length so as not to interfere during tipping of the container 3.

The tanks 5 preferably also comprise two supplementary bottles 16a, disposed in the area 14a housing the engine 2, under the engine, and in a direction parallel to the ground and perpendicular to the longitudinal direction. These bottles preferably have a capacity ranging from 35 dm³ to 40 dm³.

These bottles 16 and 16a have metal walls approximately one centimeter thick, with an overall weight reaching a few hundred kilograms.

Finally, these tanks 5 are connected to the engine 2 by means of connection devices realized by cables, pipes, valves and the like.

The invention achieves important advantages.

In fact, the pollution generated by the vehicle 1 according to the invention is much lower with respect to cleaning vehicles utilizing petrol or diesel.

Moreover, the cost of the fuel, realized by gas and in particular by natural gas, is much lower with respect to that of petrol or diesel, as previously specified.

The vehicle 1, fed only by the gas in the tanks 5, also has a fuel range of over eight hours, and can therefore be easily utilized to complete long cleaning operations and return to the depot or to a filling point.

A further advantage is provided by the innovative arrangement of the tanks 5, which allow optimal weight distribution.

Another advantage is provided by the fact that, notwithstanding the presence of the tanks 5, the container 3 still has an adequate capacity. It is therefore able to work for extended periods without intermediate emptying operations.

Yet another advantage is provided by the easily accessible and easy maintenance of the tanks 5, in particular by the cylindrical bottles 16.

Last but not least advantage is provided by the form of the recesses 15, which allows tipping of the container 3 notwithstanding the presence of the bottles 16 and also allows an inner volume to be created in the container 3 which does not have any areas in which refuse accumulates and is difficult to dispose of.

The invention is susceptible to modifications and variants within the scope of the inventive concept.

All parts can be replaced by equivalent elements and the materials, shapes and dimensions can be any.

What I claim is:

1. Self-propelled vehicle for cleaning roads and the like, of the type comprising: a chassis (1a) extending in a longitudinal direction (1b) and with lateral sides (1c) substantially parallel to said longitudinal direction (1b); a storage apparatus (5) for a fuel gas; an engine (2) suitable to utilize fuel gas; wheels (2a) at least partly driven by said engine (2); driving means (14); a container (3) for refuse and pollutants, having side panels (3a) provided with recesses (15) expanding toward the inside of the container and extending above said lateral sides (1c) and in continuity therewith; and conveying members (4) suitable to convey refuse and pollutants from said roads to said container (3), in which said storage apparatus (5) comprises a plurality of tanks suitable to contain said fuel gas disposed at least prevalently in said recesses (15) and supported by said chassis (1a).

2. Vehicle according to claim 1, wherein said recesses (15) are at least partly connected to said side panels (3a) of said container (3) by means of connecting walls tilted in a manner suitable to facilitate the flow of refuse inside said container (3).

3. Vehicle according to claim 2, wherein said recesses (15) extend in height for a length below the height of said side panels (3a) and comprise upper connecting walls (15a) tilted with respect to a horizontal plane, to facilitate a flow of refuse fed from above.

4. Vehicle according to claim 2, wherein said container (3) has a front inlet (8) suitable to allow entry of refuse and a rear discharge door (9) opposite said inlet (8), and wherein said front inlet (8) extends substantially for the entire width of said container (3), between said side panels (3a), and is located in an upper portion of said container (3) without said recesses (15).

5. Vehicle according to claim 4, wherein said recesses (15) comprise front connecting walls (15b) facing said front entry inlet (8) and suitable to facilitate a flow of refuse toward said rear discharge door (9).

6. Vehicle according to claim 5, wherein coinciding with said front inlet (8) said container (3) has a front face (8a) substantially perpendicular to said side panels (3a), and wherein secondary connecting walls (8c) are provided, positioned between said front face (8a) and said recesses (15) and suitable to define surfaces tilted toward the bottom of said container (3), to eliminate areas in which refuse accumulates between said front face (8a) and said recesses (15).

7. Vehicle according to claim 1, wherein said container (3) is of the tipping type and said tanks (5) are secured on said chassis (1a), said recesses (15) being dimensioned and shaped in a manner suitable to allow said container (3) to be tipped.

8. Vehicle according to claim 1, wherein said tanks (5) disposed in said recesses (15) of said side panels (3a) comprise a plurality of bottles (16), parallel to one another and disposed according to rows on said side panels (3a).

9. Vehicle according to claim 8, wherein said bottles (16) are superposed on one another and each has a substantially horizontal position parallel to said longitudinal direction (1b).

10. Vehicle according to claim 9, wherein said bottles (16) are present in a number of six and have capacities ranging from 65 dm3 to 100 dm3.

11. Vehicle according to claim 9, wherein said bottles (16) are superposed on one another above rear wheels (2a).

12. Vehicle according to claim 1, wherein supplementary tanks are provided comprising at least one supplementary bottle (16a) disposed under said chassis (1a).

13. Vehicle according to claim 12, wherein said supplementary tanks are disposed substantially under said engine (2).

14. Vehicle according to claim 12, wherein said supplementary tanks comprise two supplementary bottles (16a) positioned transverse to said side panels.

15. Vehicle according to claim 1, wherein said container (3) houses a filter system (11) positioned in an upper portion of said container (3) without said recesses (15).

* * * * *